United States Patent
Chawla et al.

(10) Patent No.: US 9,419,856 B1
(45) Date of Patent: Aug. 16, 2016

(54) NETWORK DEVICE CONFIGURATION DEPLOYMENT PIPELINE

(71) Applicant: Amazon Technologies, Inc., Seattle, WA (US)

(72) Inventors: Rachit Chawla, Kirkland, WA (US); Christopher John Rose, Seattle, WA (US); Jeremy Ryan Volkman, Seattle, WA (US); Mayilan Balachandran, Seattle, WA (US); Justin Oliver Pietsch, Bothell, WA (US); Abhoy Bhaktwatsalam, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 84 days.

(21) Appl. No.: 14/557,165

(22) Filed: Dec. 1, 2014

(51) Int. Cl.
*H04L 12/28* (2006.01)
*H04L 12/24* (2006.01)

(52) U.S. Cl.
CPC ........ *H04L 41/0813* (2013.01); *H04L 41/0869* (2013.01)

(58) Field of Classification Search
USPC ........... 370/401, 352, 254, 242, 389; 709/220
See application file for complete search history.

(56) References Cited

U.S. PATENT DOCUMENTS

| | | | |
|---|---|---|---|
| 8,180,860 B2* | 5/2012 | Bovell | H04W 8/245 709/217 |
| 2003/0189905 A1* | 10/2003 | Lee | H04L 12/467 370/254 |
| 2007/0169049 A1* | 7/2007 | Gingell | G06F 8/63 717/151 |
| 2012/0311458 A1* | 12/2012 | Wolff-Petersen | G06F 15/177 715/744 |
| 2014/0207917 A1* | 7/2014 | Tock | H04L 41/0893 709/220 |

* cited by examiner

*Primary Examiner* — Duc C Ho
(74) *Attorney, Agent, or Firm* — Klarquist Sparkman, LLP (57) ABSTRACT

The following description is directed to configuring network devices. In one example, a deployed configuration for a network device can be collected. The deployed configuration can be representative of a state of the network device at the time of collection. A difference can be detected between the deployed configuration and an authoritative configuration for the network device. In response to detecting the difference, an update of the network device according to the authoritative configuration for the network device can be scheduled.

20 Claims, 7 Drawing Sheets

NETWORK DEVICE CONFIGURATION DEPLOYMENT PIPELINE

BACKGROUND

Cloud computing is the use of computing resources (hardware and software) which are available in a remote location and accessible over a network, such as the Internet. Users are able to buy these computing resources (including storage and computing power) as a utility on demand. Cloud computing entrusts remote services with a user's data, software and computation. Use of virtual computing resources can provide a number of advantages including cost advantages and/or ability to adapt rapidly to changing computing resource needs.

Cloud computing facilities can include many compute resources connected by an internal communications network of the cloud service provider. The network can include many network components or devices that may need to be upgraded or reconfigured during the operational lifetime of the cloud computing facility. Further, as resources are added to the cloud computing facility, new network components may be added to the network, increasing the size and complexity of the network. The cloud service provider may desire to provide high availability and throughput through the network, even during an upgrade or reconfiguration of the network.

DETAILED DESCRIPTION

The configuration information of a network device is a set of state that describes how the network device operates. For example, the configuration information can include addressing information, routing information, access control lists, access credentials, address translations, quality of service parameters, statistical gathering capabilities, protocol support, timer values, encryption parameters, device-specific tuning parameters, and/or any other information suitable for controlling and/or monitoring how the network device operates. When the network device is updated or configured with the configuration information, the network device will operate according to the network device configuration. The configuration information of networking devices can change during the lifetime of the networking devices as users are added, other networking devices are deployed, and new security threats are discovered. Conventional methods for updating the configuration information of a networking device include remotely logging into the network device and making changes to the configuration state of the networking device. The changes may be made in response to specific issues or upgrades of the network. Over time, the network device may have been updated many times and by many different network engineers, such that the full configuration state of the network device can only be determined by reading the configuration state off of the network device. If the network device is misconfigured, such as through an operator mistake, the network may experience degraded performance or a network event, such as a severe disruption in service.

As the network grows in size, it is not scalable for a network engineer to log into each network device and manually make changes to the configuration state of the network device. Ad-hoc automated scripts can be written to perform updates of multiple devices. However, these scripts can cause degraded performance and/or network events if there are dependencies when updating network devices and/or if the script author is unaware of the full configuration state of the network devices. For example, a network event may occur if the script allows one network device to read intermediate configuration state from another network device during its configuration. As another example, the script may overwrite essential configuration state, of which the script author was unaware, with incompatible configuration state. As yet another example, multiple scripts may be running concurrently and the different scripts may be incompatible with each other.

As described herein, network configuration management and deployment tools can potentially provide a more available, secure, scalable, and maintainable network than manual updates or ad-hoc scripting. Fully automated router provisioning, configuration, and deployments can potentially reduce availability and security risks to customers while improving change agility. An automated lifecycle management system for network devices can reduce or eliminate the need for humans (e.g., network engineers) to manually login into network devices and make network changes. Potentially all devices can be provisioned (including programmatic configuration generation, application of the configuration, validation of connections, and safely turning up the device) and managed throughout their lifecycle by automated tools, with little or no human intervention.

An automated continuous deployment pipeline for network devices (e.g., routers) can potentially provide several benefits. An authoritative configuration can be provided potentially any time and on every device. For example, the deployment pipeline can include an authoritative configuration repository with versioned configurations for every network device. By driving all configuration changes through the repository, the repository can be kept in-sync with the actual configuration state of the network devices. The deployment system can potentially be simple for a user and extensible. For example, the deployment system can provide the ability to push out full configurations or incremental (diff-based) configurations for the network devices. New and existing tools can potentially be integrated into an extensible framework. Customer impact can be reduced or eliminated by using comprehensive safety checks and fast rollback. For example, a configuration can be deployed with comprehensive pre-checks and post-checks of the system. The system can integrate with monitoring systems and a metrics dashboard. The system can support automated rollback to a last-known good configuration. The deployment system can potentially reduce the risks of concurrency by including device locking. For example, the deployment framework can provide a scheduler to push configuration changes to devices and allow tools to integrate with the locking service to handle the challenges of concurrency in a multi-tool eco-system. The deployment system can potentially raise visibility through an operationally efficient user interface. For example, the deployment system can potentially provide visibility of all configuration deployments being made to the network at any time, and can potentially allow network engineers to effectively troubleshoot network events and make configuration changes during a high severity event.

The automated continuous deployment pipeline can be used in conjunction with a workflow that includes several stages: (1) new configurations for the network devices can be programmatically generated and stored in an authoritative configuration repository; (2) the different configurations of the devices can be tracked throughout the lifecycle of the device with corresponding versions of configurations in the repository; (3) configuration changes can be reviewed through a code-review-style approval model; (4) configurations can be validated through basic sanity checks and lab testing; and (5) deployments of new configurations to the devices can include pre-checks, post-checks, and rollbacks to a known-good state for multiple classes of configuration changes.

Web services are commonly used in cloud computing. A web service is a software function provided at a network address over the web or the cloud. Clients or other web services initiate web service requests to servers and servers process the requests and return appropriate responses. The web service requests are typically initiated using, for example, an application programming interface (API) request. For purposes of simplicity, web service requests can be generally described below as API requests, but it is understood that other web service requests can be made. An API request is a programmatic interface to a defined request-response message system, typically expressed in JSON or XML, which is exposed via the web—most commonly by means of an HTTP-based web server. Thus, in certain implementations, an API can be defined as a set of Hypertext Transfer Protocol (HTTP) request messages, along with a definition of the structure of response messages, which can be in an Extensible Markup Language (XML) or JavaScript Object Notation (JSON) format. The API can specify a set of functions or routines that perform an action, which includes accomplishing a specific task or allowing interaction with a software component. When a web service receives the API request, the web service can generate a response to the request and send the response to the endpoint identified in the request.

Figure 1:
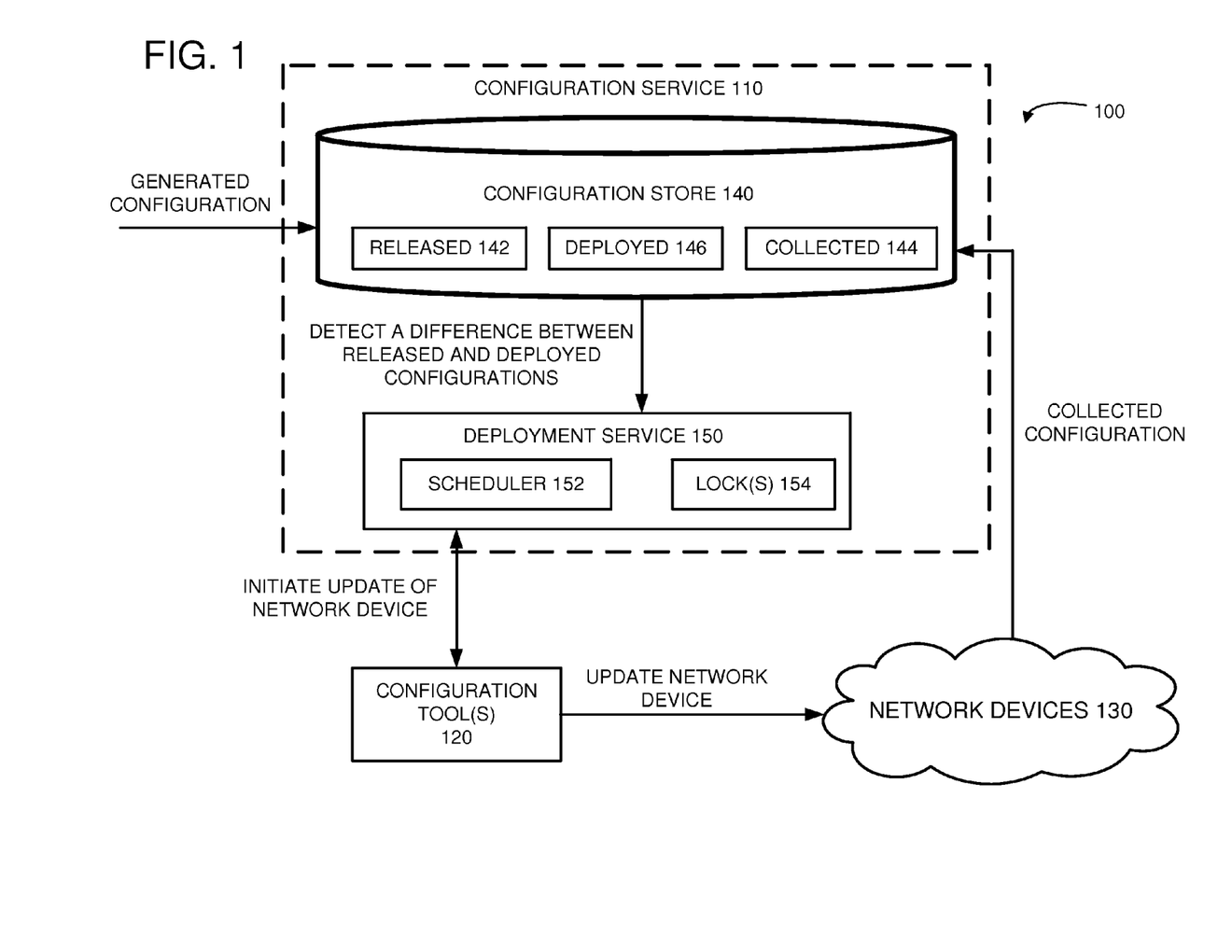
FIGS. 1 and 2 are exemplary system diagrams showing examples of network device configuration deployment pipelines.

FIG. 1 illustrates a system diagram showing an exemplary network device configuration deployment pipeline 100. The network device configuration deployment pipeline 100 can include a configuration service 110 and configuration tools 120 for updating network devices 130. The network devices 130 can be homogeneous or heterogeneous. For example, the network devices 130 can include switches (multilayer or single-layer), routers, repeaters, gateways, network bridges, hubs, protocol converters, bridge routers, proxy servers, firewalls, network address translators, multiplexers, network interface controllers, wireless network interface controllers, modems, ISDN terminal adapters, line drivers, and wireless access points. In one embodiment, the configuration service 110 can include a configuration store 140 and a deployment service 150. In an alternative embodiment, the configuration service 110 and the deployment service 150 may be separate services. As described below, the configuration store 140 can be used to store multiple versioned configurations for the network devices 130. The multiple versioned configurations can include a released configuration 142, a collected configuration 144, a deployed configuration 146, a generated configuration (not shown), and a last-known-good configuration (not shown).

The configuration store 140 can receive and store a configuration for one or more of the network devices 130. For example, the configuration store 140 can receive a generated configuration from one or more generation tools (not shown). The generated configuration can include a complete or a partial configuration for one or more of the network devices 130. Each of the network devices 130 can have the same or different generated configurations. The generated configuration can be stored as the released configuration 142. Alternatively, the generated configuration can be stored in the configuration store 140 and reviewed by one or more network engineers and/or software tools prior to being stored as the released configuration 142. For example, one or more network engineers may perform a visual inspection (e.g., code review) and/or perform experiments with the generated configuration prior to releasing the generated configuration. As another example, software tools may perform checks on the generated configuration to determine whether the generated configuration complies with one or more policies or rules. If the generated configuration is approved as having passed the automated and/or manual checks, the generated configuration can be released. The configuration data can be stored in association with metadata about the configuration, such as a status, a version number, one or more time-stamps, a latest author, an approving manager, and/or a description of the configuration data, for example.

The released configuration 142 can be an authoritative next-provisioned state of the network devices 130. In particular, the released configuration 142 is a configuration that is ready to apply to the networking devices 130 (such as after the configuration has been approved), but may not have been applied yet. Thus, the released configuration 142 can represent a trusted and accurate representation of what the configuration state of the network devices 130 should be after the network devices 130 have been updated with the released configuration 142. Thus, the released configuration 142 can differ from the current configuration state of the network devices 130 in the time between when a new released configuration 142 is stored and before the network devices 130 are updated. Each of the network devices 130 can have the same or a different released configuration 142.

The configuration state of the network devices 130 can be collected from the network devices 130 and stored as the collected configuration 144. The collected configuration 144 can represent the configuration state of the network devices 130 at the time of collection. At the time of collection, the collected configuration 144 can represent the current-provisioned state of the network devices 130. The collected configuration 144 can include separate stored state for each of the network devices 130.

The configuration state of the network devices 130 can be monitored and collected at different times and stored in multiple locations or with multiple labels. The most recently collected configuration state of the network devices 130 can be stored as the collected configuration 144. When the network devices 130 are being updated, the configuration state of the network devices 130 can be collected and stored as the deployed configuration 146 and the collected configuration 144. Thus, the deployed configuration 146 can represent the configuration state of the network devices 130 when they are updated. When the network devices 130 are updated, the deployed configuration 146 and the collected configuration 144 can be the same. However, over time, the deployed configuration 146 and the collected configuration 144 may diverge, such as when manual changes are made to the configuration state of the network devices 130. The collected configuration 144 and the deployed configuration 146 can include separate stored state for each of the network devices 130. As an alternative to collecting the deployed configuration 146, the released configuration 142 can be copied to the deployed configuration 146.

The configuration service 110 can detect a difference between the released configuration 142 and the deployed configuration 146 for one or more of the network devices 130. When a difference is detected, the configuration service 110 can cause one or more of the network devices 130 to be updated, such as by triggering an update to be scheduled via the deployment service 150. In one embodiment, the configuration service 110 can include the deployment service 150. The deployment service 150 can include a scheduler 152 and one or more locks 154. In one embodiment, the scheduler 152 can include the one or more locks 154.

The scheduler 152 can schedule an update for one or more of the network devices 130. The network devices 130 to be updated can be communicated to the scheduler 152. For example, the scheduler 152 can receive a list of the network devices 130 to be updated. The scheduler 152 can schedule the updates based on one more policies, rules, events, or other suitable criteria. For example, the network devices 130 can be updated at a given time or based on an event-trigger. For example, an update for a particular one of the network devices 130 can be scheduled for a specific time when the network is typically not busy. As another example, an update for a particular one of the network devices 130 can be scheduled based on measured performance criteria being satisfied, such as when the average bandwidth through a network device is less than a threshold. As yet another example, an update for a particular one of the network devices 130 can be scheduled to follow an update for a different one of the network devices 130. As yet another example, an update for a particular one of the network devices 130 can be scheduled to occur when additional network devices are deployed or when other network devices are taken off-line.

At the scheduled event or time, the deployment service 150 can initiate the update of one or more of the network devices 130 so that each device can be configured according to the released configuration 142 for the network devices 130. The deployment service 150 can manage multiple concurrent updates to the network devices 130 using the one or more locks 154. By utilizing the locks 154, the deployment service 150 can reduce the likelihood of introducing a race condition during the deployment of the network device configurations that could potentially cause degraded performance of the network. The locks 154 can also reduce the likelihood of configuration changes made by one tool or a human from being overwritten by another tool or human. The locks 154 can be associated with one or more of the network devices 130 and/or one or more of the configuration tools 120. For example, updating a first network device using a first tool may be conditioned on obtaining a lock associated with the first network device and another lock associated with the first tool. In one embodiment, initiating an update of one or more of the network devices 130 can be conditional on obtaining one or more of the locks 154. In an alternative embodiment, an update of one or more of the network devices 130 can be initiated without obtaining one or more of the locks 154, but one or more steps of the update can be conditional on obtaining one or more of the locks 154. In other words, some parts of the update can occur without the lock and other parts of the update may need a lock to be performed.

One or more of the configuration tools 120 can be used to update the network devices 130 according to the released configuration 142. The configuration tools 120 can be used to update all of the state associated with the released configuration 142 or a portion of the state associated with the released configuration 142. For example, the configuration tools 120 can include different tools for updating credentials, updating access control lists (ACLs), and updating routing tables. The configuration tools 120 can include pre-checks, post-checks, and roll-backs. For example, pre-checks can include obtaining one or more of the locks 154, reading or collecting the current configuration state of the network devices 130 to be updated, comparing the current configuration state to the deployed configuration state 146, checking the released configuration 142 against a set of rules or policies, quiescing traffic and/or processes on the network devices 130, and aborting the update if any of the pre-checks fail. The pre-checks can be performed before the released configuration 142 state is pushed to the network devices 130. The post-checks can be performed after the released configuration 142 state is pushed to the network devices 130. The post-checks can include reading or collecting the current configuration state of the network devices 130 that were updated, comparing the collected configuration state 144 to the released configuration state 142, enabling traffic and/or processes on the network devices 130, releasing one or more of the locks 154, and initiating a roll-back if any of the post-checks fail. The roll-back can be used to push the last-known-good configuration to the network devices 130 if the post-checks fail.

Figure 2:
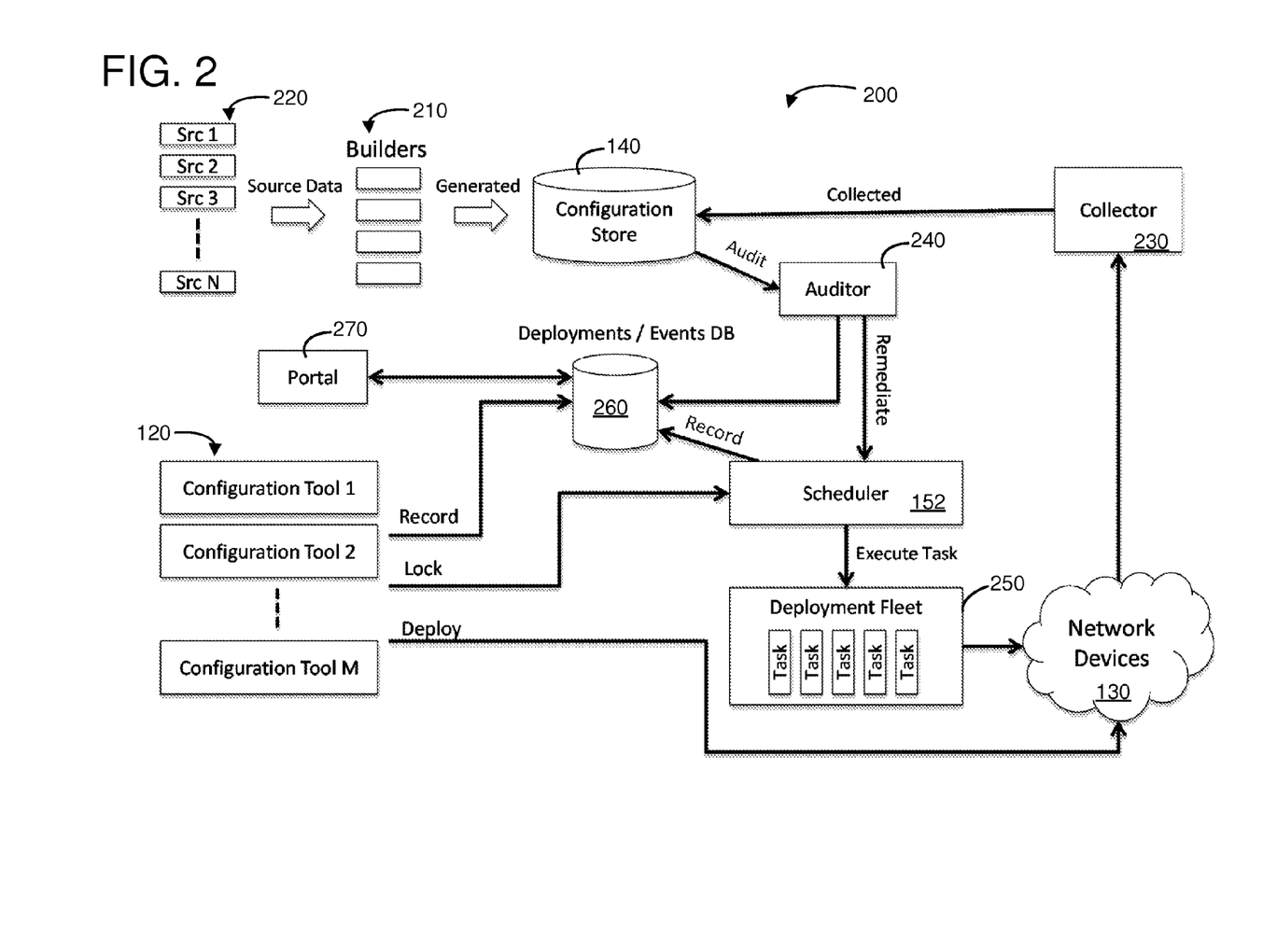

FIG. 2 illustrates a system diagram showing another example of a network device configuration deployment pipeline 200. The deployment pipeline 200 can include programmatic configuration generation systems (e.g., builders 210) for generating a complete configuration for a network device from a subset of configuration information for the network device. The subset of configuration information can be stored in data sources 220. The data sources 220 can include one or more repositories for holding one or more types of configuration data, such as a credential repository for maintaining credentials, an ACL repository, and other repositories suitable for storing network device configuration data. The data sources 220 can be used as input to the builders 210. Additionally or alternatively, configuration state from the configuration store 140 can be used as input to the builders 210. The builders 210 can perform checks on the configuration state inputs and generate a complete network device configuration from the inputs to the builders 210. The checks can include verifying that the configuration state inputs comply with polices and rules of the network. As one example, the builders 210 can create a complete configuration when an ACL repository of data sources 220 is updated. The builders 210 can generate the complete configuration by combining the non-ACL configuration state of the released configuration 142 with the ACL configuration information from data sources 220, for example. In one embodiment, the builders 210 can generate the network device configuration in a canonical form (as described with reference to FIG. 5 below) for the network device.

The generated configuration can be communicated from the builders 210 to the configuration store 140 where the generated configuration can be stored. As described above, the configuration store 140 can include multiple versioned configurations for the network devices 130 including a released configuration 142, a collected configuration 144, a deployed configuration 146, a generated configuration, and a last-known-good configuration. The generated configuration can be stored as the released configuration 142 when it is received or the generated configuration can undergo an approval process prior to being stored as the released configuration 142. The collector service 230 can be used to collect configuration state from the network devices 130. The collector service 230 can be called by other services of the deployment pipeline 200 via an application programming interface (API). For example, the collector service 230 can be called by the configuration tools 120 to collect the deployed configuration 146 of one or more network devices 130 as one step of the update process. The collector service 230 can be part of the configuration service 110, the deployment service 150, or a separate service, for example.

The auditor service 240 can monitor the configuration store 140 and determine if there is a difference between the released configuration 142 and the collected configuration 144 or the deployed configuration 146. The deployed configuration 146 can be collected by the collector service 230 when the network devices 130 are updated, or the deployed configuration 146 can be copied from the released configuration 142 when the network devices 130 are updated. The auditor service 240 can be part of the configuration service 110, the deployment service 150, or a separate service, for example. If the auditor service 240 detects a difference, the auditor service 240 can cause the difference to be remediated by causing an update of the network device to be scheduled via the scheduler service 152. As described above, the scheduler service 152 can schedule the update based on a variety of criteria. The scheduler service 152 can monitor the scheduling criteria and can initiate an update of the network devices 130 when the scheduling criteria is met. The scheduler service 152 can initiate an update of the network devices 130 by executing one or more of the configuration tools 120 and/or a task of a deployment fleet 250. The deployment service 150 can include the tasks of the deployment fleet 250. Thus, an update of the network devices 130 can be performed by one or more configuration tools 120 that are separate from the deployment service 150. Alternatively, an update of the network devices 130 can be performed by one or more tasks of the deployment fleet 250.

The configuration tools 120 and deployment fleet 250 can request one or more locks 154 from the scheduler 152 prior to or during updating the network devices 130. The configuration tools 120 and deployment fleet 250 can install or deploy the released configuration 142 to the network devices 130. For example, the released configuration 142 can be transmitted to one or more of the network devices and then installed. After installation, the configuration tools 120 and deployment fleet 250 can call the collector service 230 to collect the deployed configuration 146. Alternatively, a different service (not shown) can download or read the current configuration state from the network devices 130 when the network devices 130 are updated. The configuration tools 120 and deployment fleet 250 can perform pre-checks, post-checks, and roll-back as described above. The configuration tools 120 and deployment fleet 250 can record a log of activity on a deployments/events database 260 and release the one or more locks 154 after the deployed configuration 146 has been collected and the deployment log has been recorded on the deployments/events database 260.

The deployments/events database 260 can be used to store various information about activities and events occurring within the deployment pipeline 200. For example, the deployments/events database 260 can be used to store the version of configuration information pushed to the network devices 130 and the time when the network devices 130 are updated. Thus, an audit trail can be created to provide network engineers with data to effectively troubleshoot network events and make configuration changes during a high severity event. For example, a portal 270 can provide a user interface for accessing the deployments/events database 260, data sources 220, and configuration store 140. The portal 270 can provide access to raw data recorded on the databases. The portal 270 can present notifications and alerts of events occurring in the network 130 and/or the deployment pipeline 200. For example, the scheduler 152 can record when an update is initiated and the portal can show an alert that the update has started.

The deployments/events database 260, data sources 220, and configuration store 140 can include magnetic disks, direct-attached storage, network-attached storage (NAS), storage area networks (SAN), redundant arrays of independent disks (RAID), magnetic tapes or cassettes, DVDs, or any other medium which can be used to store information in a non-transitory way and which can be accessed by one or more services of the deployment pipeline 200.

Figure 3:
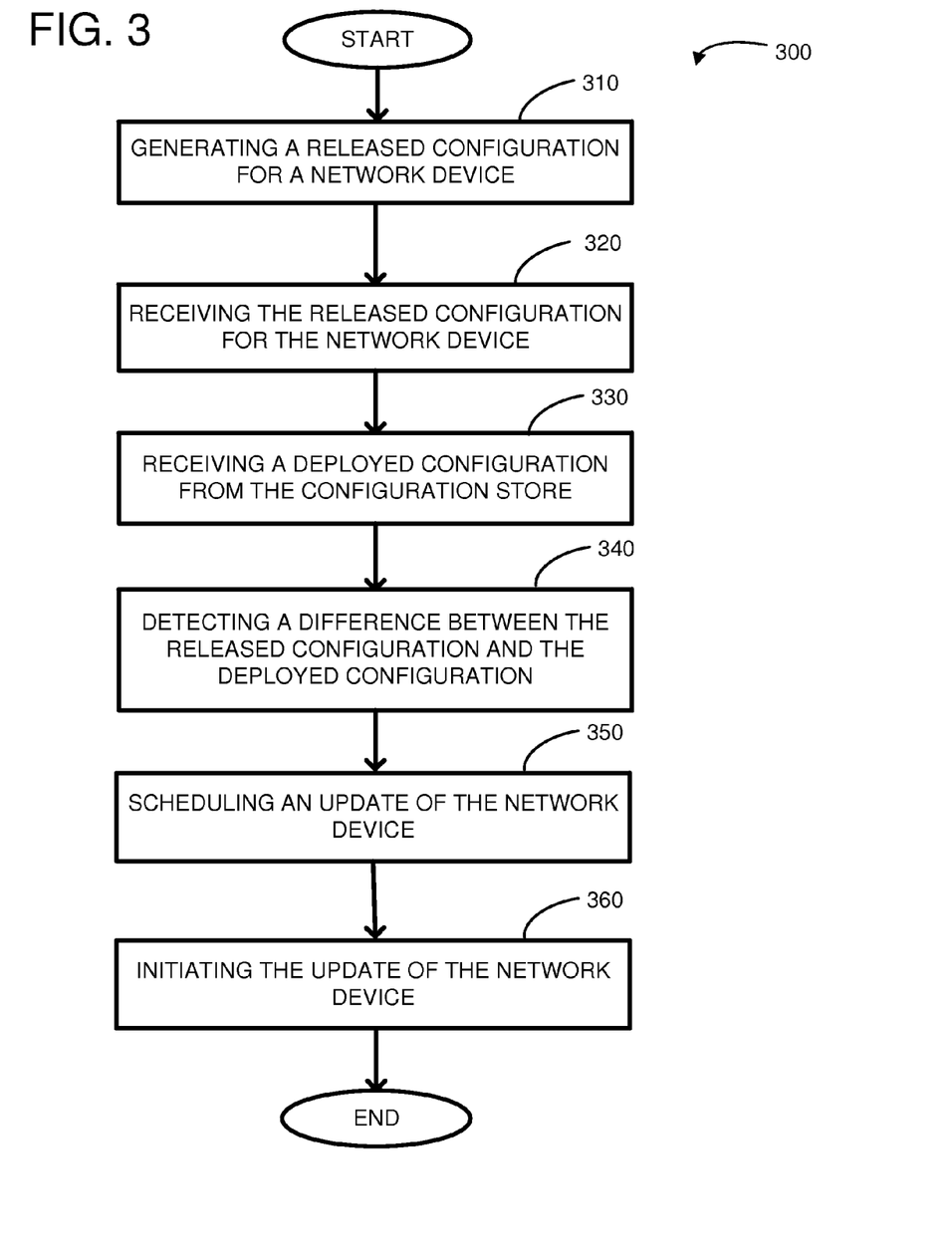
FIG. 3 is an example flow diagram of an example method for initiating an update of a network device.

FIG. 3 is a flow diagram of an example method 300 for initiating an update of network devices, such as one or more of the network devices 130. At 310, a released configuration can be generated for a network device, such as one or more of the network devices 130. The released configuration can represent an authoritative next-provisioned state of the network device. For example, the builders 210 can generate a released configuration in response to a subset of the configuration information being updated in data sources 220. The released configuration can be communicated from the builders 210 to the configuration store 140. As another example, a released configuration can be generated after a code-review approval process, such as by changing a status of the configuration from "under-review" to "released."

At 320, the released configuration for the network device can be received. For example, a generated configuration can be communicated to the configuration service 110 by the builders 210. As another example, the released configuration can be received when the configuration is accepted as the authoritative configuration, such as when a status of the configuration is changed to "released." The configuration service 110 can store the configuration in the configuration store 140 as the released configuration 142.

At 330, a deployed configuration can be received from the configuration store 140. For example, the deployed configuration 146 can be copied from the released configuration 142. As another example, the configuration state of a newly updated network device can be collected by the collector service 230 and stored in the configuration store 140 as the deployed configuration 146. For example, the collector service 230 can remotely login to the network device, execute a "show run" on the network device, and capture the output of the command (such as by piping the output to a log file). The collected configuration can be stored in the configuration store 140 as the deployed configuration 146 as a backend step of the network device update. Additionally, configuration state from the network devices 130 can be stored as a collected configuration 144 when the configuration state is collected at times other than during an update of the network devices 130. As described further with reference to FIG. 5 (below), the deployed configuration can be canonicalized prior to storing to, or after it is read from, the configuration store 140.

At 340, a difference between the released configuration and the deployed configuration can be detected. For example, the auditor service 240 can perform a comparison between the released configuration 142 and the deployed configuration 146 to determine if there is a difference between them. When doing the comparison between the released configuration 142 and the deployed configuration 146, some parts of the configuration can be filtered or masked. In particular, a portion of the configuration can be excluded from the comparison between the released configuration 142 and the deployed configuration 146. For example, when a portion of the configuration includes data that does not affect the operation of the network device it may be desirable to exclude this information from the comparison. As a specific example, the deployed configuration 146 may include data that is hardware- or topology-specific, but does not affect the operation of the network device. However, configuration data that affects the operation of the network device can be included in the comparison.

At 350, an update of the network device can be scheduled. For example, the update can be scheduled by the scheduler service 152 based on detecting a difference between the released configuration 142 and the deployed configuration 146. The update can be scheduled based on one more policies, rules, events, or other suitable criteria. For example, the update for a particular network device can be scheduled for a specific time, based on a measured performance criteria being satisfied, based on another network device being updated, or based on an event within the network occurring.

At 360, the update of the network device can be initiated upon the scheduled event occurring. For example, the scheduler service 152 or another service can monitor the criteria of scheduled events, and when the criteria for the scheduled event is satisfied, the scheduler service 152 can initiate the update of the network device. The update can be initiated by calling or executing one or more of the configuration tools 120 and/or the tasks of the deployment fleet 250. As a result of the update, the released configuration 142 can be loaded or installed on one or more of the network devices 130, and the post-installation configuration state can be collected from the network device and stored at the configuration store 140. The update is described in further detail with reference to FIG. 4.

Figure 4:
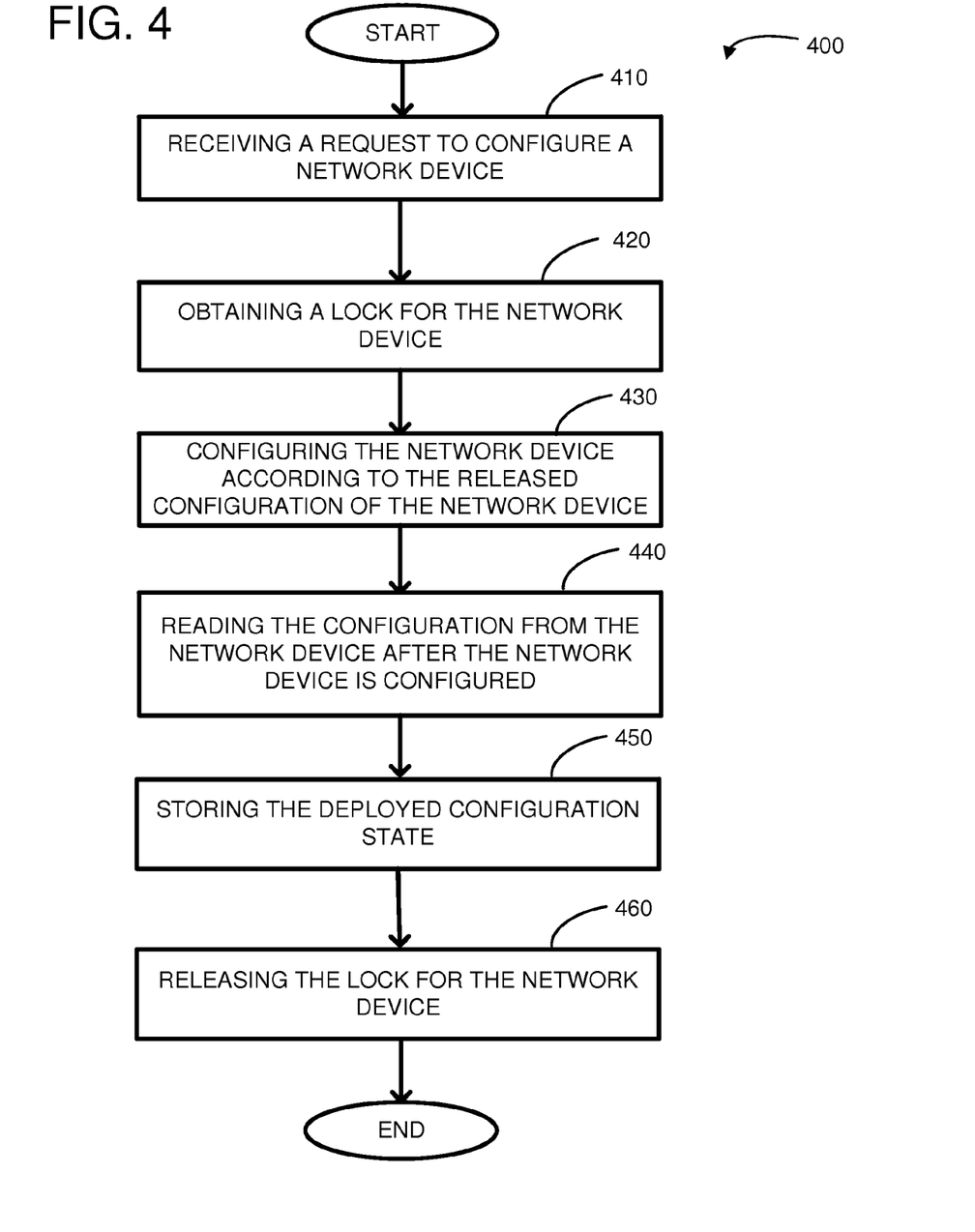
FIG. 4 is an example flow diagram of an example method for updating a network device.

FIG. 4 is a flow diagram of an example method 400 for updating a network device, such as one of the network devices 130. At 410, a request to configure a network device is received. For example, the request may be received by the deployment service 150 in response to a scheduled event occurring. In particular, the scheduler service 152 or another service can monitor the criteria of scheduled events, and when the criteria for the scheduled event is satisfied, the scheduler service 152 can generate a request to configure the network device. The scheduler service 152 can communicate the request to the deployment service 150.

At 420, one or more locks, such as the locks 154, can be obtained. The lock(s) to be obtained can correspond to a lock for the network device to be updated and/or a lock for one or more of the configuration tools 120 or the tasks of the deployment fleet 250. It can be desirable to obtain a lock for the network device and/or configuration tools to reduce the likelihood of operational network state being inadvertently overwritten or intermediate network state being inadvertently captured. The method 400 can block (e.g., wait or stall) until the lock is obtained. If the lock is not obtained within a threshold amount of time, the service managing the locks, such as the deployment service 150, can indicate a "time-out" or "lock-unavailable" condition, and can abort the update of the network device. By indicating that the lock is not available within a threshold period of time, the potential for deadlock within the deployment pipeline can be reduced. A time-out event can be logged in the deployments/events database 260 and/or an alert can be displayed at the portal 270 when a lock is not obtained within the threshold amount of time.

At 430, the network device can be configured according to the released configuration of the network device. Configuration of the network device can include one or more front-end steps. For example, the network device can be configured after satisfying one or more pre-checks or preconditions, such as obtaining one or more locks (as described at 420). Another example of a precondition is determining whether the current configured state of the network device matches the deployed state of the network device. Specifically, the collector service 230 can collect the present or current state of the network device and if the current configuration does not match the deployed configuration 146 (e.g., the precondition fails), then the update to the network device can be aborted, and the event can be logged in the deployments/events database 260 and/or an alert can be displayed at the portal 270. It can be desirable for the present state of the network to match the deployed configuration 146 to reduce the likelihood of operational network state being inadvertently overwritten.

Configuration of the network device can include installing the released configuration 142 onto the network device using one or more of the configuration tools 120 or the tasks of the deployment fleet 250. For example, the configuration tools 120 can be used to update all of the configuration state of the network device associated with the released configuration 142 (a full configuration). As another example, the configuration tools 120 can be used to update a portion of the configuration state associated with the released configuration 142 (an incremental configuration). The choice between performing a full or an incremental configuration can be determined by analyzing the differences between the released configuration 142 and the deployed configuration 146. For minor differences, performing an incremental configuration may potentially reduce the time, risk, and/or resources for performing the incremental configuration. The partial configuration can update the configuration state of the network device that corresponds to differences between the released configuration 142 and the deployed configuration 146. Thus, after a partial configuration is complete, the released configuration 142 and the deployed configuration 146 can be the same, just as if a full configuration were performed.

Configuration of the network device can include one or more back-end steps, such as 440 and 450, performed after the released configuration 142 state is pushed to the network devices. For example, the back-end steps can include verifying whether the configuration of the network device was successful (e.g., post-checks) and supporting automated rollback to a last-known good configuration. At 440, the updated configuration state from the network device can be read after the network device is updated. For example, the collector service 230 or another service can be called to read or capture the configuration state from the network device. As described below, with reference to FIG. 5, the captured configuration state can be canonicalized to aid with the comparison between the captured configuration state and the released configuration state. As an alternative to capturing the configuration state, the configuration state can be copied from the released configuration 142.

At 450, the captured (or copied) configuration state can be stored as the deployed configuration state 146. In other words, the deployed configuration 146 can be updated or synchronized so that the deployed configuration 146 reflects the current configuration state of the recently updated (at 430) network device. If the deployed configuration 146 matches the released configuration 142, the configuration update is successful. Otherwise, a rollback to the last-known good configuration can be initiated and/or an event can be logged in the deployments/events database 260 and/or an alert can be displayed at the portal 270. At 460, the lock for the network device can be released. Freeing the lock can potentially allow another tool to access the network device.

Figure 5:
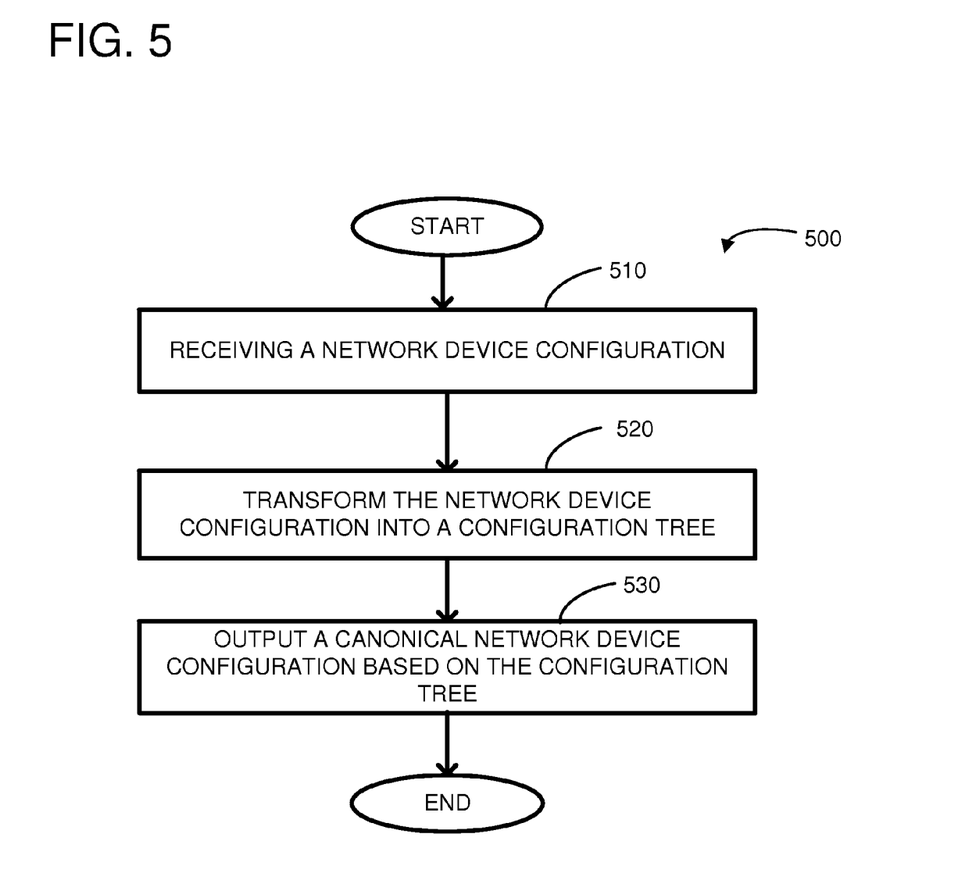
FIG. 5 is an example flow diagram of an example method for generating a canonical network device configuration.

FIG. 5 is a flow diagram of an example method 500 for generating a canonical network device configuration. The network device configuration is a set of state that controls how the network device operates. A portion of the network device configuration can be unchangeable or fixed (e.g., read-only) before the network device leaves the manufacturer and a portion of the network device configuration can be programmable (e.g., read/write), such as when the network device is deployed in a network. The programmable state of the network device can include computer-readable memory, such as one or more registers, that is pre-programmed with a default value so that the default value determines the operation of the network device unless or until the computer-readable memory is programmed to a different state. Thus, the network device can operate according to the default state of the configuration registers without being programmed after the network device is deployed. The programmable state of the network device can include computer-readable memory, such as random-access memory (RAM), that is not defined until the computer-readable memory is programmed with a value. Thus, the network device configuration can be a combination of default state and programmed state.

When a network device is programmed, the fixed state and the default state of the network device does not need to be programmed since this state is resident in the registers of the network device. Thus, tools, such as builders 210, that generate a network device configuration may omit the fixed state and the default state from the network device configurations they generate because this state does not need to be separately programmed. Alternatively, the builders 210 can be designed to output a network device configuration in canonical form. The network device configuration deployment pipeline may use a set of heterogeneous tools for builders 210 and so different generators (e.g., builders 210) may produce the network device configurations in different formats.

When configuration state is read or collected from a network device, some of the configuration state can be omitted or censored in the collected state, the collected state can include some or all of the default states, and the configuration state can be returned in a different order and/or with a different format than when the configuration state is programmed. The collected configuration state can be censored because the network device configuration can include state that is only accessible by a user or service that has authorization to read that state. For example, credentials and private keys can be stored on the network device and can affect how the network device operates, but this configuration information cannot be read (e.g., it is censored or masked) by a typical user or service since they do not have authorization to read this information. The collected configuration can include duplicative information and/or configuration information that is device-specific or non-critical to the overall operation of the network.

Comparing generated configurations to unprocessed or raw collected configurations can be challenging because of the differences outlined above. Comparisons can potentially be simplified or be more accurate if the configurations to be compared are transformed into canonical configurations prior to the comparison. A complete canonical configuration is a representation of all of the configuration state of the network device presented in a uniform way without duplicative state. The uniform presentation can include a single ordering of configuration state, a single format for representing configuration state, and/or a structure for organizing the configuration state. A partial canonical configuration is a representation of all of the configuration state corresponding to a portion of the configuration state of the network device presented in a uniform way without duplicative state. For example, a partial canonical configuration can exclude configuration state that is censored or masked when the configuration state is read by the collector 230 from the network devices 130. As another example, a partial canonical configuration can exclude configuration state that is non-critical to the overall operation of the network.

Returning to FIG. 5, at 510, a network device configuration can be received. The network device configuration can be a generated, stored, or a collected configuration. For example, the collector service 230 can collect the network device configuration state from one or more of the network devices 130. As another example, a generated network device configuration can be received from the builders 210. As yet another example, a stored network device configuration can be retrieved from the configuration store 140. Mask information associated with the network device configuration can also be received. For example, the mask information can correspond to one or more sections of the network device configuration that are censored or non-critical.

At 520, the network device configuration can be transformed into a configuration tree. For example, the network device configuration can be syntactically analyzed based on a grammar of the network device. The syntactic analysis can include lexical analysis (e.g., breaking the network device configuration into tokens) and parsing the tokens to create the configuration tree. The configuration tree is a data structure that represents the configuration state of the network device. A structure of the configuration tree can correspond to the configuration state of the network device. For example, a node of the configuration tree can correspond to access control and children of the node can correspond to the values of the access control list. As another example, a different node of the configuration tree can correspond to routing and children of the node can correspond to the values of the routing tables of the network device. In one embodiment, the configuration tree can include restricted and/or non-critical configuration state (such as credentials). In an alternate embodiment, the configuration tree can exclude restricted and/or non-critical configuration state.

At 530, a canonical network device configuration can be output based on the configuration tree. For example, the canonical network device configuration can be generated as the configuration tree is walked. If mask information is received at 510, the mask information can be used to exclude one or more sections from the canonical network device configuration. Thus, a complete or partial canonical configuration can be generated.

Figure 6:
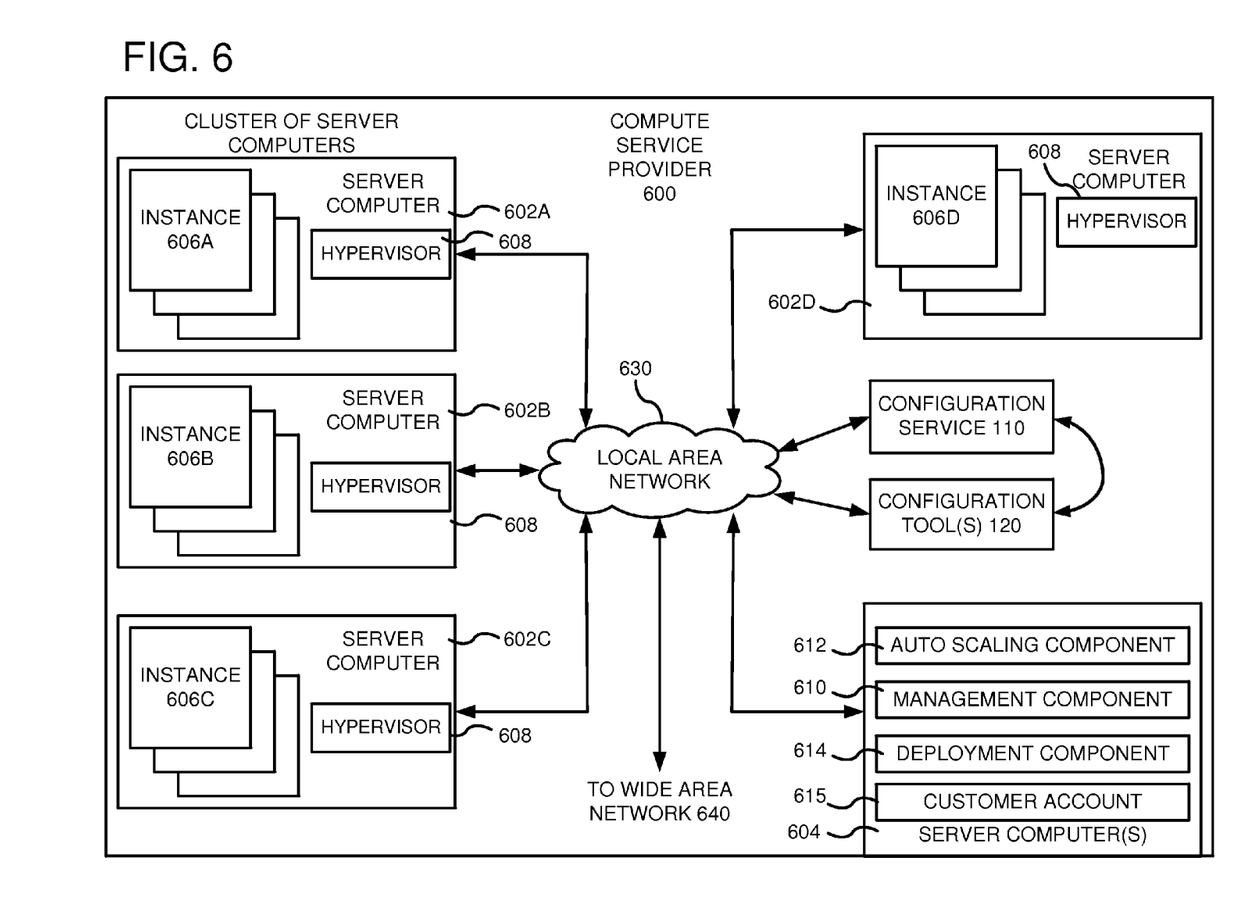
FIG. 6 is an example system diagram showing a plurality of virtual machine instances running in the multi-tenant environment.

FIG. 6 is a computing system diagram of a network-based compute service provider 600 that illustrates one environment in which embodiments described herein can be used. By way of background, the compute service provider 600 (i.e., the cloud provider) is capable of delivery of computing and storage capacity as a service to a community of end recipients. In an example embodiment, the compute service provider can be established for an organization by or on behalf of the organization. That is, the compute service provider 600 may offer a "private cloud environment." In another embodiment, the compute service provider 600 supports a multi-tenant environment, wherein a plurality of customers operate independently (i.e., a public cloud environment). Generally speaking, the compute service provider 600 can provide the following models: Infrastructure as a Service ("IaaS"), Platform as a Service ("PaaS"), and/or Software as a Service ("SaaS"). Other models can be provided. For the IaaS model, the compute service provider 600 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 600 using networked client devices, such as desktop computers, laptops, tablets, smartphones, etc. running web browsers or other lightweight client applications. Those skilled in the art will recognize that the compute service provider 600 can be described as a "cloud" environment.

The particular illustrated compute service provider 600 includes a plurality of server computers 602A-602D. While only four server computers are shown, any number can be used, and large centers can include thousands of server computers. The server computers 602A-602D can provide computing resources for executing software instances 606A-606D. In one embodiment, the instances 606A-606D are virtual machines. As known in the art, a virtual machine is an instance of a software implementation of a machine (i.e. a computer) that executes applications like a physical machine. In the example of virtual machine, each of the servers 602A-602D can be configured to execute a hypervisor 608 or another type of program configured to enable the execution of multiple instances 606 on a single server. Additionally, each of the instances 606 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 604 can be reserved for executing software components for managing the operation of the server computers 602 and the instances 606. For example, the server computer 604 can execute a management component 610. A customer can access the management component 610 to configure various aspects of the operation of the instances 606 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 612 can scale the instances 606 based upon rules defined by the customer. In one embodiment, the auto scaling component 612 allows a customer to specify scale-up rules for use in determining when new instances should be instantiated and scale-down rules for use in determining when existing instances should be terminated. The auto scaling component 612 can consist of a number of subcomponents executing on different server computers 602 or other computing devices. The auto scaling component 612 can monitor available computing resources over an internal management network and modify resources available based on need.

A deployment component 614 can be used to assist customers in the deployment of new instances 606 of computing resources. It should be noted that the deployment component 614 is different from the network device configuration deployment pipelines 100 and 200. The deployment component 614 can have access to account information associated with the instances, such as who is the owner of the account, credit card information, country of the owner, etc. The deployment component 614 can receive a configuration from a customer that includes data describing how new instances 606 should be configured. For example, the configuration can specify one or more applications to be installed in new instances 606, provide scripts and/or other types of code to be executed for configuring new instances 606, provide cache logic specifying how an application cache should be prepared, and other types of information. The deployment component 614 can utilize the customer-provided configuration and cache logic to configure, prime, and launch new instances 606. The configuration, cache logic, and other information may be specified by a customer using the management component 610 or by providing this information directly to the deployment component 614. The instance manager can be considered part of the deployment component.

Customer account information 615 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 630 can be utilized to interconnect the server computers 602A-602D and the server computer 604. The network 630 can include the network devices 130. The network 630 can be a local area network (LAN) and can be connected to a Wide Area Network (WAN) 640 so that end users can access the compute service provider 600. It should be appreciated that the network topology illustrated in FIG. 6 has been simplified and that many more networks and networking devices can be utilized to interconnect the various computing systems disclosed herein.

A network device configuration deployment pipeline can be used to deploy and/or update one or more of the network devices 130 of the network 630. The network device configuration deployment pipeline can include the configuration service 110 and the configuration tools 120. The configuration service 110 can include a configuration store 140 for storing multiple versions of device configurations, such as a released configuration 142 and a deployed configuration 146. When a difference between the released configuration 142 and the deployed configuration 146 is detected, the configuration service 110 can schedule and initiate an update of the network 630. For example, the configuration service 110 can execute or call one or more of the configuration tools 120 to update one or more of the network devices 130 of the network 630 according to the released configurations for the network devices 130. The network device configurations can be collected from the network 630 to confirm whether the network devices were configured properly.

Figure 7:
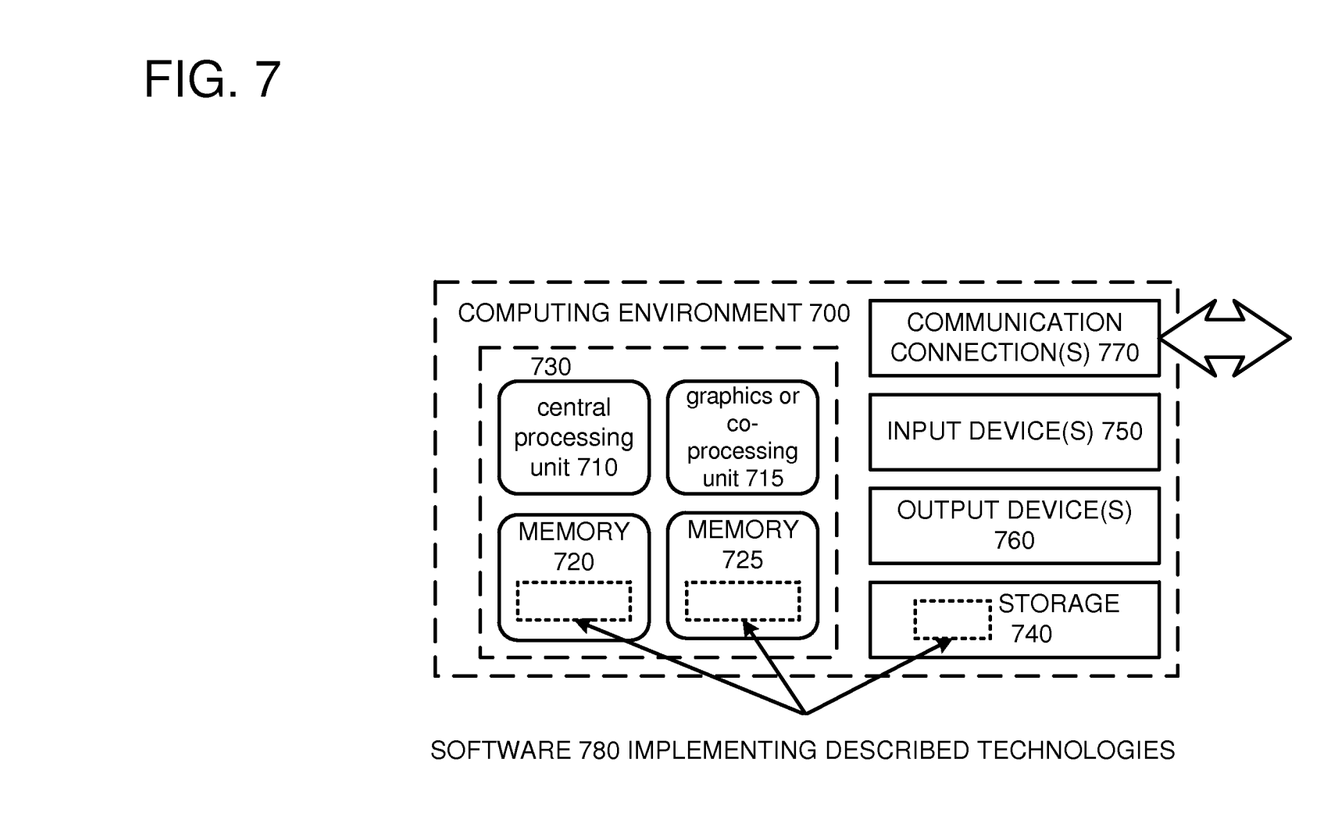
FIG. 7 depicts a generalized example of a suitable computing environment in which the described innovations may be implemented.

FIG. 7 depicts a generalized example of a suitable computing environment 700 in which the described innovations may be implemented. The computing environment 700 is not intended to suggest any limitation as to scope of use or functionality, as the innovations may be implemented in diverse general-purpose or special-purpose computing systems. For example, the computing environment 700 can be any of a variety of computing devices (e.g., desktop computer, laptop computer, server computer, tablet computer, etc.)

With reference to FIG. 7, the computing environment 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s).

A computing system may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing environment 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-Programmable Gate Arrays (FPGAs), Application-Specific Integrated Circuits (ASICs), Application-Specific Standard Products (ASSPs), System-On-a-Chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method of configuring a network device, the method comprising:
   receiving a released configuration for the network device, the released configuration representing an authoritative next-provisioned state of the network device;
   receiving a deployed configuration, the deployed configuration representing a current-provisioned state of the network device;
   detecting a difference between the released configuration and the deployed configuration;
   in response to detecting the difference, scheduling an update of the network device;
   when scheduled, initiating the update of the network device so that the network device is configured according to the released configuration for the network device; and
   updating the deployed configuration according to the released configuration for the network device.

2. The method of claim 1, wherein detecting the difference between the released configuration and the deployed configuration comprises:
   generating one or more canonical configurations from one or more of the deployed configuration or the released configuration; and
   comparing a canonical configuration corresponding to the deployed configuration to a canonical configuration corresponding to the released configuration.

3. The method of claim 2, wherein generating one or more canonical configurations comprises:
   generating tokens from one or more of the deployed configuration or the released configuration, the tokens being part of a grammar of the network device;
   generating a configuration tree from the tokens; and
   generating the canonical configuration based on the configuration tree.

4. The method of claim 1, further comprising:
   locking the network device during the update of the network device; and
   reading configuration state from the network device after the network device is configured according to the released configuration and before unlocking the network device.

5. The method of claim 4, further comprising:
   comparing the released configuration to the updated deployed configuration; and
   generating an alert when the released configuration is different from the updated deployed configuration.

6. The method of claim 1, further comprising:
   generating the released configuration for the network device from a subset of configuration data for the network device.

7. The method of claim 1, wherein the released configuration and the deployed configuration are stored on a configuration store that is separate from the network device.

8. A computer-readable storage medium including instructions that upon execution cause a computer system to:
   collect a deployed configuration for a network device, the deployed configuration representative of a state of the network device at the time of collection;
   generate a canonical deployed configuration from the deployed configuration;
   detect a difference between the canonical deployed configuration and an authoritative configuration for the network device; and
   in response to detecting the difference, schedule an update of the network device according to the authoritative configuration for the network device.

9. The computer-readable storage medium according to claim 8, wherein the instructions, upon execution, further cause the computer system to:
   request a lock corresponding to the network device when the update of the network device is scheduled to occur; and
   initiate the update of the network device after the lock is acquired.

10. The computer-readable storage medium according to claim 8, wherein the instructions, upon execution, further cause the computer system to:
    acquire a lock corresponding to the network device;
    after the lock is acquired, read a current configuration for the network device; and
    abort the update of the network device if a difference is detected between the current configuration and the deployed configuration.

11. The computer-readable storage medium according to claim 10, wherein detecting the difference between the current configuration and deployed configuration comprises:
    generating a canonical current configuration from the current configuration; and
    comparing the canonical current configuration to the deployed configuration.

12. The computer-readable storage medium according to claim 8, wherein the instructions, upon execution further cause the computer system to:
    request a lock corresponding to the network device when the update of the network device is scheduled to occur; and
    update the network device, after the lock is acquired, by remotely logging into the network device and installing the authoritative configuration on the network device.

13. The computer-readable storage medium according to claim 8, wherein the deployed configuration is read from the network device during a scheduled update of the network device.

14. The computer-readable storage medium according to claim 8, wherein the instructions, upon execution, further cause the computer system to:
    during the update of the network device, collect a current configuration for the network device; and
    initiate a rollback of the network device to a last-known-good configuration if a difference is detected between the current configuration and the authoritative configuration.

15. The computer-readable storage medium according to claim 8, wherein generating the canonical deployed configuration from the deployed configuration comprises:
    generating tokens from the deployed configuration, the tokens being part of a grammar of the network device;
    generating a configuration tree from the tokens; and
    generating the canonical deployed configuration based on the configuration tree.

16. A computing system comprising:
    a configuration store for storing a released configuration and a deployed configuration of a network device, the configuration store separate from the network device; and
    a configuration service in communication with the configuration store, the configuration service configured to:
    detect a difference between the released configuration and the deployed configuration;

schedule an update of the network device in response to the detecting the difference between the released configuration and the deployed configuration;

when the update is scheduled to occur, obtain a lock on the network device and trigger the update of the network device;

after the update of the network device, receive configuration state from the network device and then release the lock on the network device; and process the received configuration state from the network device and store the processed configuration state as the deployed configuration.

17. The computing system according to claim 16, wherein processing the received configuration state from the network device comprises generating a canonical configuration from the received configuration state.

18. The computing system according to claim 16, wherein detecting the difference between the released configuration and the deployed configuration comprises excluding a portion of the configuration state when comparing the released configuration and the deployed configuration.

19. The computing system according to claim 16, wherein the update of the network device is scheduled to occur when a measured performance criteria is satisfied.

20. The computing system according to claim 16, wherein the configuration service is further configured to:

receive a generated configuration for the network device;

store the generated configuration in the configuration store; and identify the generated configuration as the released configuration when the generated configuration is approved.

* * * * *